3,456,000
DERIVATIVES OF ALANINE

André L. Langis, St. Laurent, Montreal, Quebec, Canada, assignor to American Home Products Corporation, New York, N.Y., a corporation of Delaware
No Drawing. Filed Jan. 5, 1966, Ser. No. 518,769
Int. Cl. C07c *101/68, 101/26, 101/52*
U.S. Cl. 260—518   8 Claims

ABSTRACT OF THE DISCLOSURE

New α-methyl-β-N-substituted alanines wherein the substituent on the nitrogen atom is one of the following: N-piperidyl, N - morpholinyl, N - 1,2,3,4-tetrahydroisoquinolyl, (N'-benzyl-N-piperazinyl), 1-heramethyleneimino, N-methylbenzylamino, N-methyl-(2-chlorobenzylamino), N-methyl-(3,4-dichlorobenzylamino), N-methyl-(3-methoxybenzylamino), N-methyl - (4-methoxybenzylamino), N-isopropylbenzylamino or N-methyl-(3,4-dimethoxybenzylamino). These compounds are useful as hypotensive agents and methods for their formulation in pharmaceutical preparations for their intended use are given. Also disclosed is a method for preparing the new substituted alanines by hydrolysis of corresponding hydantoins.

---

New Derivatives of Alanine

This invention relates to new derivatives of alanine possessing the general structure I.

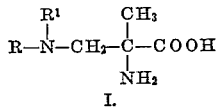

I.

in which R represents a monovalent basic radical such as the radical of a nitrogen-containing heterocycle, for example, piperidine, morpholine, tetrahydroisoquinoline, N-benzylpiperazine, or hexamethyleneimine, or of a substituted benzylamine, such as, for example, N-isopropylbenzylamine or N-methylbenzylamine; the benzyl radical in the latter group of substituents may also be suitably substituted, with substituents such as halogen or lower alkoxy groups being preferred. $R^1$ represents a lower alkyl group containing from one to three carbon atoms, or it is part of the heterocycle represented by the symbol R. This invention relates also to the pharmacologically acceptable salts of the above compounds.

The compounds of this invention and their pharmacologically acceptable salts possess blood-pressure lowering activities and are useful as hypotensive agents. As such, they may be formulated with suitable excipients such as lactose, starch, magnesium stearate or magnesium silicate, in tablets or capsules containing from 50–500 mg. of the active ingredient. They may also be formulated in sterile solutions containing from 25–250 mg. per ml. for parenteral administration.

The compounds of this invention are most conveniently prepared by hydrolyzing the corresponding hydantoins of Formula III, the latter compounds are prepared by reacting first a substituted secondary amine of the formula $RR^1NH$, in which R and $R^1$ have the significance defined above, with chloroacetone to obtain an intermediate (tertiary amino)ketone of the formula $RR^1NCH_2COCH_3$ (II); and then reacting the latter intermediate of Formula II with ammonium carbonate and potassium cyanide in the conventional manner to obtain the corresponding hydantoin of Formula III hydrolysis of the hydantoins of Formula III with a basic hydrolyzing agent such as, for example, an alkaline earth hydroxide, yields the substituted analines of Formula I. Barium hydroxide is the preferred agent. The excess hydrolyzing agent may be neutralized, the products of neutralization removed, preferably by filtration, and the desired alanine derivative isolated from the filtrate. If desired, the latter compounds may be reacted with substantially molar equivalents of a pharmacologically acceptable acid to obtain the corresponding pharmacologically acceptable salts.

The following formulae, in which R and $R^1$ have the significance defined above, and examples will illustrate this invention. All compounds described in the following examples are identified by elemental analysis.

$$RR^1NH + ClCH_2COCH_3 \longrightarrow RR^1NCH_2COCH_3 \quad II.$$

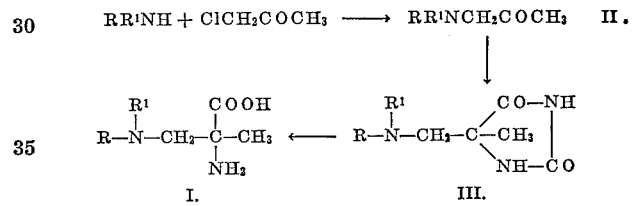

EXAMPLE 1

38.7 g. (0.18 mole) of 5-methyl-5-N-piperidylmethyl hydantoin are added to a mixture of 127 g. (0.4 mode) of barium hydroxide octahydrate in 750 cc. of water. The solution is heated to reflux for 24 hours and then filtered hot. The filtrate is treated with ammonium carbonate, the inorganic salts are collected and the filtrate evaporated under reduced pressure, to yield α-methyl-β-N-piperidyl alanine, crystallized from water, M.P. 285–288° C.

EXAMPLES 2–12

In the same manner as described in Example 1, but using the appropriately substituted hydantoin as the starting material and substantially two equivalents of barium hydroxide as the hydrolyzing agent, the following substituted alanines are also obtained.

| Example No. | Starting material, Hydantoin | Final product, Alanine | M.P., C°. |
|---|---|---|---|
| 2 | 5-methyl-5-N-morpholinomethyl. | α-Methyl-β-N-morpholinyl. | 294–298 |
| 3 | 5-methyl-5-(N-1,2,3,4-tetrahydroisoquinolylmethyl). | α-Methyl-β-N-1,2,3,4-tetrahydroisoquinolyl. | 264–268 |
| 4 | 5-methyl-5-(N'-benzyl-N-piperazinylmethyl). | α-Methyl-β-(N'-benzyl-N-piperazinyl). | 242–245 |
| 5 | 5-methyl-5-hexamethyleneiminomethyl. | α-Methyl-β-1-hexamethyleneimino. | 265–266 |
| 6 | 5-methyl-5-N-methyl-benzylaminomethyl. | α-Methyl-β-N-methyl-benzylaminoalanine. | 218–222 |
| 7 | 5-methyl-5-N-methyl-(2-chlorobenzylaminomethyl). | α-Methyl-β-N-methyl-(2-chlorobenzylamino). | 235–237 |
| 8 | 5-methyl-5-N-methyl-(3,4-dichlorobenzylaminomethyl). | α-Methyl-β-N-methyl-(3,4-dichlorobenzylamino). | 200–205 |
| 9 | 5-methyl-5-N-methyl-(4-methoxybenzylaminomethyl). | α-Methyl-β-N-methyl-(4-methoxybenzylamino). | 198–200 |
| 10 | 5-methyl-5-N-methyl-(3-methoxybenzylaminomethyl). | α-Methyl-β-N-methyl (3-methoxybenzylamino). | 203–205 |
| 11 | 5-methyl-5-N-isopropyl-benzylaminomethyl. | α-Methyl-β-N-isopropyl-benzylamino. | 201–203 |
| 12 | 5-methyl-5-N-methyl (3,4-dimethoxybenzylaminomethyl). | α-Methyl-β-N-methyl-(3,4-dimethoxybenzylamino). | 186–189 |

I claim:
1. A compound selected from bases of the formula

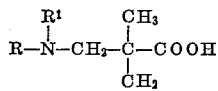

wherein R is a monovalent radical selected from the group which consists of benzyl, 2-chlorobenzyl, 3,4-dichlorobenzyl, 3-methoxybenzyl, 4-methoxybenzyl, and 3,4-dimethoxybenzyl; and $R^1$ is a lower alkyl group containing from one to three carbon atoms; and salts of said bases with pharmacologically acceptable acids.

2. α - Methyl - β - N - methylbenzylaminoalanine, as claimed in claim 1.

3. α - Methyl-β-N-methyl - (2 - chlorobenzylamino) alanine, as claimed in claim 1.

4. α - Methyl-β-N - methyl(3,4 - dichlorobenzylamino) alanine, as claimed in claim 1.

5. α - Methyl-β-N-methyl - (4 - methoxybenzylamino) alanine, as claimed in claim 1.

6. α - Methyl-β-N - methyl(3 - methoxybenzylamino) alanine, as claimed in claim 1.

7. α - Methyl - β - N - isopropylbenzylaminoalanine, as claimed in claim 1.

8. α - Methyl - β - N - methyl-(3,4-dimethoxybenzylamino)alanine, as claimed in claim 1.

References Cited

UNITED STATES PATENTS 2,951,078   8/1960   Biel _____ 260—247.5

Chemical Abstracts, vol. 60, pp. 6825–6, Cheng et al., 1964.

HENRY R. JILES, Primary Examiner
S. WINTERS, Assistant Examiner

U.S. Cl. X.R.

260—239, 247.2, 268, 287, 294, 309.5, 519; 424—244, 248, 250, 258, 267, 319